(12) United States Patent
Dunn (10) Patent No.: US 11,395,462 B2
(45) Date of Patent: Jul. 26, 2022

(54) SEEDLING CONTAINER WITH FRANGIBLE TEAR-OFF STRIP

(71) Applicant: W. Michael Dunn, Concord, NH (US)

(72) Inventor: W. Michael Dunn, Concord, NH (US)

( * ) Notice: Subject to any disclaimer, the term of this patent is extended or adjusted under 35 U.S.C. 154(b) by 32 days.

(21) Appl. No.: 13/844,649

(22) Filed: Mar. 15, 2013

(65) Prior Publication Data

US 2014/0259910 A1   Sep. 18, 2014

(51) Int. Cl.
*A01G 9/02* (2018.01)
*A01G 9/00* (2018.01)

(52) U.S. Cl.
CPC .......... *A01G 9/02* (2013.01); *A01G 2009/003* (2013.01)

(58) Field of Classification Search
CPC ................................. A01G 2009/003
USPC ..... 47/66.1, 66.3, 66.4; 229/120.01, 120.011
See application file for complete search history.

(56) References Cited

U.S. PATENT DOCUMENTS

| | | | | |
|---|---|---|---|---|
| 2,009,539 A | * | 7/1935 | Wootton | B65D 3/10 229/201 |
| 2,275,896 A | * | 3/1942 | Geist | B65D 3/262 229/125.17 |
| 2,968,124 A | * | 1/1961 | Coplen | A01G 9/026 47/73 |
| 3,195,272 A | * | 7/1965 | Mosher et al. | 47/73 |
| 3,300,118 A | * | 1/1967 | Owens | B65D 3/263 206/830 |
| 3,402,876 A | * | 9/1968 | Kuchenbecker | B65D 3/263 220/270 |
| 3,736,889 A | | 6/1973 | Reid | |
| 3,798,837 A | | 3/1974 | Oehmke et al. | |
| 3,877,633 A | * | 4/1975 | Peck | B65D 75/68 206/216 |
| 3,990,179 A | * | 11/1976 | Johnson et al. | 47/67 |
| 4,050,188 A | | 9/1977 | van Wingerden | |
| 4,113,100 A | * | 9/1978 | Soja | B65D 5/5445 229/112 |
| 4,179,846 A | | 12/1979 | Carlisle | |

(Continued)

FOREIGN PATENT DOCUMENTS

| | | | | |
|---|---|---|---|---|
| FR | 1414728 | * | 10/1965 | ............... A01G 9/02 |
| FR | 2491033 | * | 4/1982 | ............. A01G 9/086 |

(Continued)

OTHER PUBLICATIONS

Web page "Dillen Web Trays & Inserts" downloaded from http://www.harrisseeds.com/storefront/s-615-dillen-web-trays-inserts.aspx on or about Mar. 21, 2010.

(Continued)

*Primary Examiner* — Peter M Poon
*Assistant Examiner* — Morgan T Jordan
(74) *Attorney, Agent, or Firm* — JTT Patent Services, LLC; Gerald T. Peters (57) ABSTRACT

One embodiment of the present invention is a seedling container having seedling compartment(s). Frangible tear-off strip(s) divide seedling compartment(s) into top portion(s) and bottom portion(s). Pulling on pull tab(s) of frangible strip(s) permits removal of frangible strip(s) from seedling compartment(s) so as to permit bottom portion(s) to be conveniently removed from top portion(s). Seedling plug(s) retained by rim-like top portion(s) may thus be conveniently transplanted without creating excessive mess or damage to seedling(s).

22 Claims, 4 Drawing Sheets

(56) References Cited

U.S. PATENT DOCUMENTS

| | | | |
|---|---|---|---|
| 4,205,485 | A | 6/1980 | Olsen |
| 4,593,830 | A | 6/1986 | Bullock |
| 4,691,834 | A | 9/1987 | Bullock |
| 5,119,588 | A * | 6/1992 | Timmis et al. ............ 47/58.1 R |
| 5,157,869 | A * | 10/1992 | Minton .............................. 47/73 |
| 5,224,616 | A | 7/1993 | Crisci |
| 5,231,794 | A * | 8/1993 | Weder ...................... A01G 5/04 220/694.1 |
| 5,414,959 | A * | 5/1995 | Weder ................... A47G 7/085 229/87.01 |
| 6,405,481 | B1 * | 6/2002 | Bautner ............................. 47/77 |
| RE37,821 | E * | 8/2002 | VanWingerden ................. 47/73 |
| 6,427,379 | B1 * | 8/2002 | Lehner ........................... 47/66.1 |
| 6,474,490 | B1 | 11/2002 | Seibel et al. |
| 6,481,593 | B2 * | 11/2002 | Banhagel ...................... 220/676 |
| 7,540,110 | B2 * | 6/2009 | Al-Sulaiman et al. ......... 43/108 |
| 7,726,068 | B2 * | 6/2010 | Nottingham ........................ 47/9 |
| 2006/0273098 | A1 | 12/2006 | Emalfarb |
| 2008/0028678 | A1 * | 2/2008 | Banhagel ......................... 47/73 |
| 2009/0173002 | A1 * | 7/2009 | Plihal .............................. 47/66.3 |
| 2011/0296755 | A1 * | 12/2011 | Hawkinson ........ A01G 13/0268 47/65.8 |

FOREIGN PATENT DOCUMENTS

| | | | |
|---|---|---|---|
| FR | 2972604 A1 * | 9/2012 | |
| WO | 1986004563 A1 | 8/1986 | |
| WO | 1994029185 A1 | 12/1994 | |

OTHER PUBLICATIONS

Web page "Excel Plugs" downloaded from http://www.harrisseeds.com/storefront/s-790-excel-plugs.aspx on or about Mar. 21, 2010.
Web page "Jiffy Peat Pellets" downloaded from http://www.harrisseeds.com/storefront/s-616-jiffy-peat-pellets.aspx on or about Mar. 21, 2010.
Web page "Jiffy Strips" downloaded from http://www.harrisseeds.com/storefront/s-619-jiffy-strips.aspx on or about Mar. 21, 2010.
Web page "Plug Trays" downloaded from http://www.harrisseeds.com/storefront/s-810-plug-trays.aspx on or about Mar. 21, 2010.
Web page "Q-Plugs Seed Starters" downloaded from http://www.harrisseeds.com/storefront/s-621-q-plugs-seed-starters.aspx on or about Mar. 21, 2010.
Web page "Propagation Supplies" downloaded from http://www.harrisseeds.com/storefront/s-280-propagation-supplies.aspx?_cr=ppc|google|broadmatch|jiffy+pot&gclid=CJGqzpKYw6ACFcIM5Qod5DI9OA on or about Mar. 21, 2010.
Web page "Jiffy Peat Pots" downloaded from http://www.harrisseeds.com/Storefront/s-617-jiffy-peat-pots.aspx on or about Mar. 21, 2010.

* cited by examiner

SEEDLING CONTAINER WITH FRANGIBLE TEAR-OFF STRIP

FIELD OF INVENTION

The present invention relates to a seedling container, and more particularly relates to a seedling container having a frangible tear-off strip.

BACKGROUND

Seedlings which will ultimately be transplanted to a larger container or to an outdoor garden are often started in trays or other containers containing soil or growing medium. When the seedling has grown to sufficient size within the container, at which time the roots may crowd together to form a plug in combination with the growing medium, the seedling plug is usually considered to be ready for transplanting. In the case of peat pots or other such decomposable container material, seedling plugs may be transplanted together with the decomposable container. In the case of plastic trays or other such nondecomposable container material, the seedling plug is usually removed from the container before being transplanted.

However, even where ostensibly decomposable containers are employed, many gardeners prefer to remove the seedling from the container prior to transplanting, either because of lack of certainty regarding whether the container is in fact decomposable, or because even where the container is known to be decomposable there may nonetheless be reason to think that presence of even a decomposable container may retard root growth as compared with the situation in which the seedling is transplanted without any container at all.

Regardless of whether the container is decomposable or nondecomposable, removal of the seedling plug from the container can be frustrating and time-consuming, as the seedling plug often adheres to the container walls, and the intertwined roots may interfere with smooth and clean expulsion of the seedling plug from its container.

Furthermore, such problems are compounded when there are a plurality of seedling plugs in the respective compartments of a tray or other such multiple-seedling container. Whether attempting to simultaneously eject a plurality of seedlings from their respective compartments, or whether attempting to eject a particular single seedling thereamong, the result is rarely what the gardener intended.

Especially with such a tray-like container, seedling roots and/or tops are easily damaged as seedlings successively become freed in unpredictable manner from their respective compartments. For example, when a gardener inverts such a container and taps or pounds on the bottom thereof in an attempt to free seedlings therefrom, a falling seedling may easily suffer damage when it lands on its top or its stem is broken from the impact of the fall.

Such jostling, impact, and piecemeal ejection of seedlings from seedling containers can be frustrating and tedious, can create considerable mess, and can aggravate the phenomenon of transplanting shock, whereby disturbance of seedling root systems during transplanting has a negative effect on seedling growth.

There is therefore a need for a seedling container that will permit seedling(s) to be easily removed therefrom without creating excessive mess or causing excessive damage to seedling(s).

SUMMARY

To address the foregoing need, one aspect of the invention provides a seedling container having a compartment for receiving one or more seeds and growing medium, the compartment comprising a top portion; a bottom portion; and a frangible strip between the top portion and the bottom portion; wherein the compartment defines an axial direction; wherein the frangible strip is separated from the top portion by an upper score line and is separated from the bottom portion by a lower score line; wherein the upper score line is arranged about the periphery of the compartment so as to form a first at least partially closed loop having a locus which is more or less circumferential with respect to the compartment axial direction; wherein the lower score line is arranged about the periphery of the compartment so as to form a second at least partially closed loop having a locus which is more or less circumferential with respect to the compartment axial direction, the upper score line being generally parallel to the lower score line; and wherein a transverse score line interconnects the lower score line and the upper score line.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
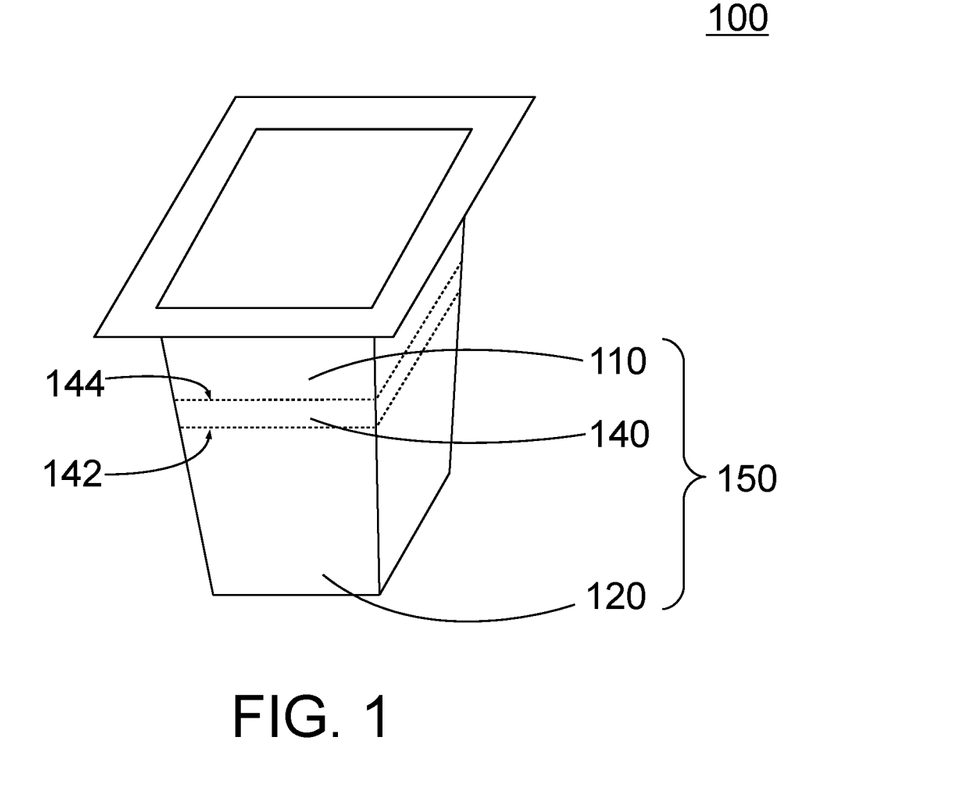
FIG. 1 is a perspective view of a single-seedling container 100 in accordance with one embodiment of the present invention.

Referring to FIG. 1, a first embodiment of the present invention is a single-seedling container 100 having one or more frangible tear-off strips 140 dividing a compartment 150 into a top portion 110 and a bottom portion 120.

The single-seedling container 100 shown at FIG. 1 might be used for growing an individual seedling. The single-seedling container 100 has a single compartment 150 for receiving soil or other growing medium and for receiving one or more seeds that will be allowed to grow into a seedling plug ready for transplanting to a larger container or to an outdoor garden. Although referred to for convenience as a single-seedling container and described in terms of an example in which a single seedling is grown therein, there is no objection to using the seedling container 100 for growing multiple seedlings in the single compartment 150 thereof. Any suitable decomposable or nondecomposable material may be used for the container 100, examples including thermoplastic or thermosetting resin (foamed and/or unfoamed) and cardboard. The container 100 may be manufactured through use of a mold or by any other appropriate method.

Although the compartment 150 in the embodiment shown in FIG. 1 has rectangular cross-section as viewed from the top, the present invention may be applied to seedling containers having compartments of circular, oval, polygonal, or any other arbitrary cross-sectional shape. Regardless of the cross-sectional shape of the compartment 150, the compartment 150 is preferably open at the top so as to be able to receive growing medium, and the compartment 150 preferably has wall(s) and/or a bottom so as to be at least partially closed at the side(s) and/or bottom. The side(s) and/or bottom may have passage(s) for drainage and/or aeration. The compartment 150 defines an axial direction more or less in the direction in which a seedling stem tends to grow as it emerges more or less centrally from the open compartment top.

In the embodiment shown, the compartment 150 has a tearable frangible strip 140. The frangible strip 140 may be formed from the same material as the compartment walls. The frangible strip 140 in one embodiment is a region at least partially bounded by an open or closed perimeter comprising material that is perforated, scored, or otherwise weakened so as to have a tear strength that is lower than that of the surrounding material. Note that where the term "score line" is for convenience employed herein to describe the constitution of the frangible strip 140, this should be understood as nonlimiting so as to include all manner of lines of weakened material, whether formed with reduced thickness or thereafter weakened by perforation or cutting or any other suitable method, or produced in any other suitable fashion.

Figure 5:
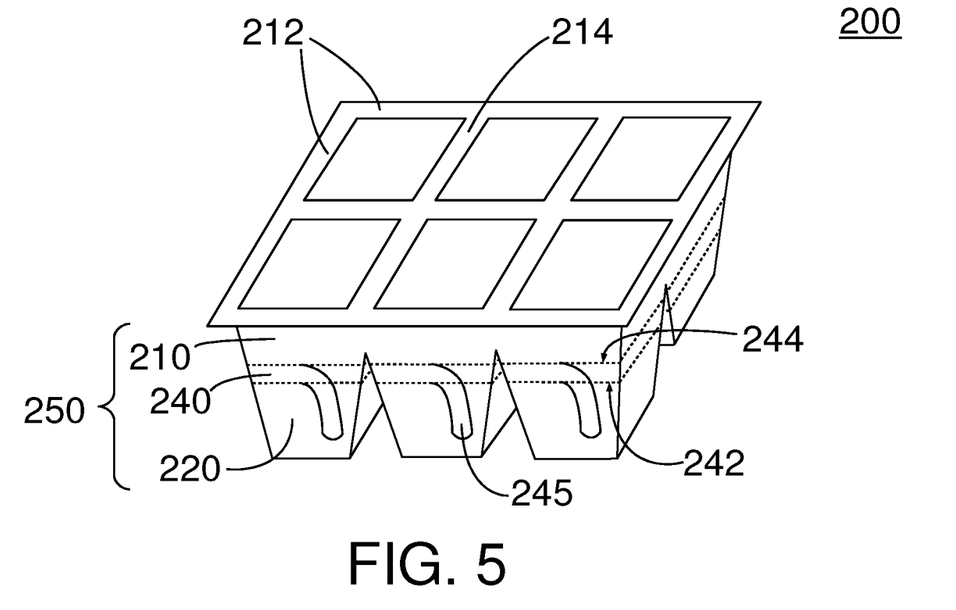
FIG. 5 is a perspective view of a multiple-seedling container 200 in accordance with another embodiment in which each compartment 250 has its own independently tearable frangible strip 240 and the compartments 250 are intended not to be separated from each other prior to transplanting but are intended to be transplanted together as an integral unit.

Although not visible in the view shown in FIG. 1, the frangible strip 140 of the individual seedling container 100 has a pull tab 145 similar to the pull tab 245 shown at each compartment 250 in the tray-like seedling container 200 shown in FIG. 5. There is no particular restriction with respect to the length of the pull tab 145, but to afford sufficient length for grasping by a gardener without becoming so long as to cause tangling or the like, in one embodiment it is preferred that the pull tab 145 be not less than 0.5 cm and not more than 5.0 cm in length, and it is still more preferred that the pull tab 145 be not less than 1.0 cm and not more than 3.0 cm in length.

A lower score line 142 or other such region of weakened material runs continuously or nearly continuously about the periphery of the compartment 150 to form a closed or nearly closed loop having a locus arranged more or less circumferentially with respect to the compartment axial direction. Similarly, an upper score line 144 or other such region of weakened material runs continuously or nearly continuously about the periphery of the compartment 150 to form a closed or nearly closed loop having a locus arranged more or less circumferentially with respect to the compartment axial direction and generally parallel to the lower score line 142 such that the frangible strip 140 has more or less uniform width. Although the frangible strip 140 has more or less uniform width in the embodiment shown in FIG. 1, there is no particular objection to embodiments in which the frangible strip has varying width. For example, it may be desirable to employ a frangible strip of varying width so as to avoid or so as to intentionally include various features of the seedling container. There is no particular restriction with respect to the magnitude of the width of the frangible strip 140, but based upon considerations of material strength and practicality, it is preferred that the frangible strip 140 be not less than 0.5 mm and not more than 1.0 cm in width, and it is still more preferred that the frangible strip 140 be not less than 0.1 cm and not more than 0.3 cm in width. Employment of a frangible strip 140 of such width will allow separation of the bottom portion 120 from the top portion 110 with minimal disturbance to the seedling(s) in the compartment 150.

Where it is said above with respect to the lower score line 142 and the upper score line 144 that these run continuously or nearly continuously about the periphery of the compartment 150, and that the loop formed thereby is closed or nearly closed, this is to allow for various ways of routing the score lines 142, 144 in the vicinity of the pull tab 145. That is, the lower score line 142 and/or the upper score line 144 may be discontinuous in the vicinity of where the pull tab 145 is attached to the frangible strip 140. Furthermore, the loop(s) formed by the lower score line 142 and/or the upper score line 144 may be open in the vicinity of where the pull tab 145 is attached to the frangible strip 140.

Figure 2:
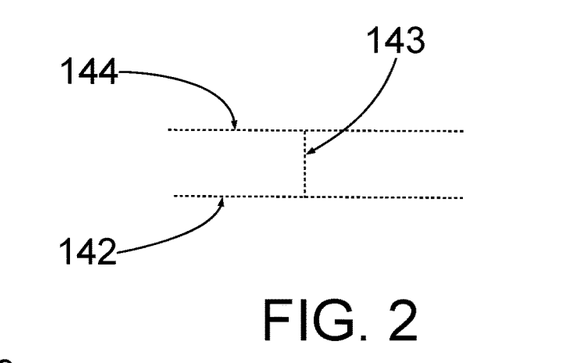
FIG. 2 is a front view of a first example of attachment of the pull tab 145 to the frangible strip 140 in the embodiment of FIG. 1.
Figure 3:
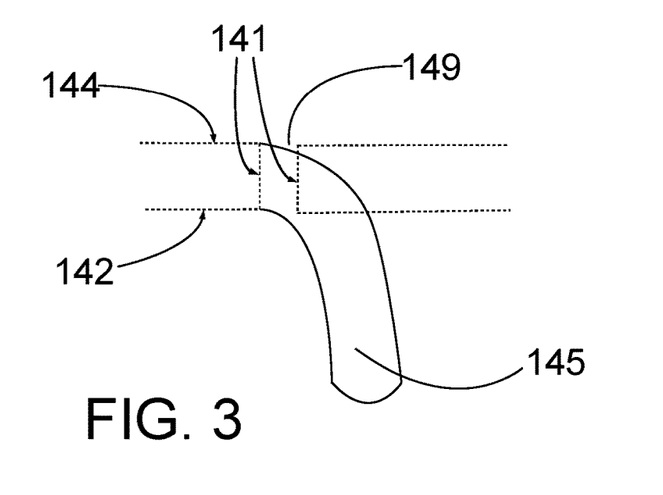
FIG. 3 is a front view of a second example of attachment of the pull tab 145 to the frangible strip 140 in the embodiment of FIG. 1.
Figure 4:
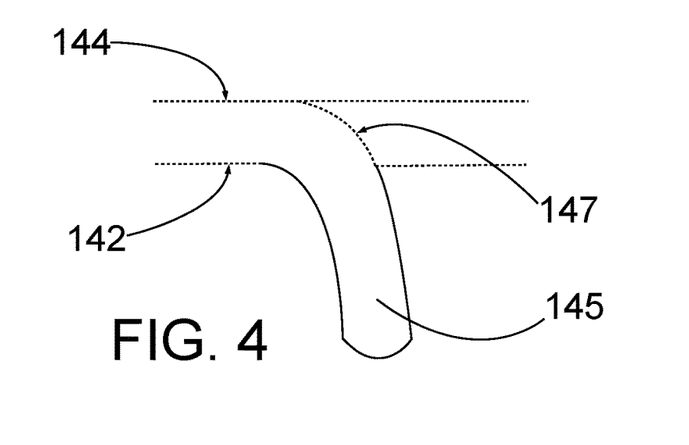
FIG. 4 is a front view of a third example of attachment of the pull tab 145 to the frangible strip 140 in the embodiment of FIG. 1.

FIGS. 2, 3, and 4 show three exemplary ways in which the score lines 142, 144 may be routed in the vicinity of the pull tab 145. Although three possible ways of routing the score lines 142, 144 in the vicinity of the pull tab 145 are shown by way of example, the invention is not limited to the specific arrangements shown and there is no objection to routing the score lines 142, 144 in the vicinity of the pull tab 145 in any suitable manner that permits the bottom portion 120 of the compartment 150 to be separated and removed from the top portion 110 of the compartment 150 as a result of pulling on the pull tab 145.

FIG. 2 shows a first example of attachment of the pull tab 145 to the frangible strip 140. In the example shown in FIG. 2, a transverse score line 143 interconnects the lower score line 142 and the upper score line 144. Depending on the material employed for the frangible strip 140 and the pull tab 145, the pull tab 145, not shown, may be attached by glue or other adhesive, solvent weld or other resin-bonding technique, or by other suitable method to the frangible strip 140 at a location to one side as viewed in the drawing of the transverse score line 143. When the pull tab 145 is attached to the frangible strip 140 in this way, pulling on the pull tab 145 will cause the frangible strip 140 to tear at the transverse score line 143 and also at the lower and upper score lines 142, 144 on the side of the transverse score line 143 at which the pull tab 145 is attached. For example, if the pull tab 145 is attached to the right of the transverse score line 143 as seen in the drawing, pulling on the pull tab 145 will cause tearing of the transverse score line 143 and also of the lower and upper score lines 142, 144 to the right of the transverse score line 143. As the pull tab 145 continues to be pulled, the fact that the transverse score line 143 is now torn guides the pull tab 145 to the right, and the lower and upper score lines 142, 144 naturally continue to tear in that direction (toward the right for the example in which the pull tab 145 was attached to the right side of the transverse score line 143 as seen in the drawing) as the pull tab 145 is pulled further to the right, and then around each corner of the compartment 150 in turn, until the pull tab 145 is brought back to the front, with tearing of the lower and upper score lines 142, 144 continuing until the location at which the transverse score line 143 was present is reached, at which point the frangible strip 140 will have been completely removed and it will be possible to separate the bottom portion 120 of the compartment 150 from the top portion 110 of the compartment 150.

Although a transverse score line 143 was shown at FIG. 2, similar effect may be obtained where the transverse score line 143 is not merely scored or weakened material, but is a location at which the material is cut all the way through the compartment wall thickness. Where transverse score line 143 is a location at which the material is cut all the way through the compartment wall thickness, it need not be in the shape of a thin vertical line as shown in FIG. 2, but may be a cutout or hole of any suitable size and shape. Although the transverse score line 143 is shown in the drawing as being more or less perpendicular to the lower and upper score lines 142, 144, so long as the transverse score line 143 interconnects the lower and upper score lines 142, 144 it may form any suitable angle therewith. In particular, causing the transverse score line 143 to meet the lower and upper score lines 142, 144 at a shallow angle, e.g., an angle of not more than about 45° and more preferably not more than about 30°, and attaching the pull tab 145 to the frangible strip 140 at or near the vertex of that shallow angle, may encourage tearing of the transverse score line 143 and the lower and upper score lines 142, 144 to proceed in a way that facilitates the directional tearing discussed above.

FIG. 3 shows a second example of attachment of the pull tab 145 to the frangible strip 140. In the example shown in FIG. 3, the frangible strip 140 does not extend completely around the periphery of the compartment 150. Instead, the lower score line 142 and the upper score line 144 are discontinuous where a thin web 149 of material interconnects the top portion 110 of the compartment 150 and the bottom portion 120 of the compartment 150 at a location in the vicinity of where the pull tab 145 is attached to the frangible strip 140. A pair of transverse score lines 141, 141 interconnect the lower score line 142 and the upper score line 144 so as to terminate the frangible strip 140 to either side of the web 149. Depending on the material employed for the frangible strip 140 and the pull tab 145, the pull tab 145 may be attached by glue or other adhesive, solvent weld or other resin-bonding technique, or by other suitable method to the frangible strip 140, or might be molded or otherwise formed so as to be integral with the frangible strip 140, at a location to one side as viewed in the drawing of the web 149. When the pull tab 145 is attached to the frangible strip 140 in this way, pulling on the pull tab 145 will cause the frangible strip 140 to tear at the transverse score line 141 on the side of the web 149 at which the pull tab 145 is attached and also at the lower and upper score lines 142, 144 on the side of the web 149 at which the pull tab 145 is attached. Because in the example shown in FIG. 3 the pull tab 145 is attached to the left of the web 149 as seen in the drawing, pulling on the pull tab 145 will cause tearing of the transverse score line 141 to the left of the web 149 and will also cause tearing of the lower and upper score lines 142, 144 to the left of the web 149. As the pull tab 145 continues to be pulled, the fact that the transverse score line 141 on the left is now torn guides the pull tab 145 to the left, and the lower and upper score lines 142, 144 naturally continue to tear in that direction (toward the left for the example in which the pull tab 145 was attached to the left side of the web 149 as seen in the drawing) as the pull tab 145 is pulled further to the left, and then around each corner of the compartment 150 in turn, until the pull tab 145 is brought back to the front, with tearing of the lower and upper score lines 142, 144 continuing until the web 149 is reached, at which point the frangible strip 140 will have been completely removed except for the thin web 149, which is now all that joins the bottom portion 120 of the compartment 150 and the top portion 110 of the compartment 150. At this point, the web 149 can be easily torn, making it possible to separate and remove the bottom portion 120 of the compartment 150 from the top portion 110 of the compartment 150.

Although the web 149 and the transverse score lines 141, 141 are shown at FIG. 3 as being more or less perpendicular to the lower and upper score lines 142, 144, so long as the transverse score lines 141, 141 respectively interconnect the lower and upper score lines 142, 144 they may form any suitable angle(s) therewith. In particular, causing the transverse score lines 141, 141 to meet the lower and upper score lines 142, 144 at shallow angle(s), e.g., angle(s) of not more than about 45° and more preferably not more than about 30°, may encourage tearing of the transverse score lines 141, 141 and the lower and upper score lines 142, 144 to proceed in a way that facilitates the directional tearing discussed above.

FIG. 4 shows a third example of attachment of the pull tab 145 to the frangible strip 140. In the example shown in FIG. 4, a transverse score line 147 interconnects the lower score line 142 and the upper score line 144. The pull tab 145 is preferably molded or otherwise formed so as to be integral with the frangible strip 140, the score lines 142, 144, 147 preferably being formed thereafter. Where the pull tab 145 emerges from the frangible strip 140, one side edge of the pull tab 145 is collinear with or extends the curve of the transverse score line 147 so as to be indirectly connected to one of the lower and upper score lines 142, 144 by way of the transverse score line 147 which intervenes therebetween, and the other side edge of the pull tab 145 is directly connected to the other of the lower and upper score lines 142, 144. For example, in the example shown in FIG. 4, the right side of the pull tab 145 is collinear with the transverse score line 147 so as to be indirectly connected to the upper score line 144 by way of the transverse score line 147 which intervenes therebetween, and the left side of the pull tab 145 is directly connected to the lower score line 142. When the pull tab 145 is attached to the frangible strip 140 in this way, pulling on the pull tab 145 will cause the frangible strip 140 to tear at the transverse score line 147 and also at the lower and upper score lines 142, 144 on the side of the transverse score line 147 at which the pull tab 145 is attached. Because in the example shown in FIG. 4 the pull tab 145 is attached to the left of the transverse score line 147 as seen in the drawing, pulling on the pull tab 145 will cause tearing of the transverse score line 147 and will also cause tearing of the lower and upper score lines 142, 144 to the left of the transverse score line 147. As the pull tab 145 continues to be pulled, the fact that the transverse score line 147 is now torn guides the pull tab 145 to the left, and the lower and upper score lines 142, 144 naturally continue to tear in that direction (toward the left for the example in which the pull tab 145 was attached to the left side of the transverse score line 147 as seen in the drawing) as the pull tab 145 is pulled further to the left, and then around each corner of the compartment 150 in turn, until the pull tab 145 is brought back to the front, with tearing of the lower and upper score lines 142, 144 continuing until the location at which the transverse score line 147 was present is reached, at which point the frangible strip 140 will have been completely removed and it will be possible to separate the bottom portion 120 of the compartment 150 from the top portion 110 of the compartment 150.

Although a transverse score line 147 was shown at FIG. 4, similar effect may be obtained where the transverse score line 147 is not merely scored or weakened material, but is a location at which the material is cut all the way through the compartment wall thickness. Where transverse score line 147 is a location at which the material is cut all the way through the compartment wall thickness, it need not be in the shape of a thin line as shown in FIG. 4, but may be a cutout or hole of any suitable size and shape. Although the transverse score line 147 is shown in the drawing as making an angle of about 45° with the lower and upper score lines 142, 144, so long as the transverse score line 147 interconnects the lower and upper score lines 142, 144 it may form any suitable angle therewith. To encourage tearing of the transverse score line 147 and the lower and upper score lines 142, 144 to proceed in a way that facilitates the directional tearing discussed above, it is preferred in one embodiment that the transverse score line 147 make an angle of not less than about 30° and not more than about 60° with the lower and upper score lines 142, 144.

Although a single frangible strip 140 per compartment 150 is shown in the examples at FIGS. 1 through 4, there is no objection to using a combination of multiple frangible strips 140 between the top portion 110 and the bottom portion 120, in which case the bottom portion 120 would be separated from the top portion 110 after all of the frangible strips 140 at the compartment 150 have been torn and removed.

Thus, the present invention has been described in terms of an example in which the frangible strip 140 allows separation of the bottom portion 120 from the top portion 110 of the seedling compartment 150.

After the bottom portion 120 has been removed from the top portion 110, the seedling together with its roots and soil or other growing medium may naturally fall out of, or may easily be removed from, the top portion 110 that remains.

Alternatively, in some embodiments, the top portion 110 that remains, in which the seedling together with its roots and soil or other growing medium may continue to be held, may serve as rim for retaining seedlings when removal of the frangible strip causes the container bottom portion to be removed so as to expose the seedling roots. That is, in such an embodiment, the frangible strip 140 would separate a top portion 110 and a bottom portion 120, the top portion 110 serving as rim for retaining seedlings when removal of the frangible strip 140 causes the container bottom portion 120 to be removed so as to expose the seedling roots. When seedlings are ready to be transplanted, a gardener can pull on the pull tab 145 of the frangible strip 140 to tear off and remove the frangible strip 140 from the seedling compartment 150. Removal of the frangible strip 140 from the compartment 150 permits the bottom portion 120 to be conveniently removed from the top portion 110. Following removal of the bottom portion 120 from the top portion 110, the seedling plug is retained by the rim-like top portion 110. The seedling plug may thus be conveniently transplanted together with the top portion 110 without creating excessive mess or damage to the seedling.

In such an embodiment in which the top portion 110 is to serve as rim for retaining seedlings, it is preferred that the frangible strip 140 be arranged so as to be located in the axial direction so as to cause the top portion 110 to have sufficient height in the axial direction to retain the seedling and growing medium when the frangible strip 140 and the bottom portion 120 are removed therefrom prior to transplanting. Tapering of the compartment 150 in the axial direction may also facilitate retention of the seedling plug by the top portion 110 at this time. There is no particular restriction with respect to the height of the frangible strip 140 in the axial direction, but to allow sufficient height for retaining seedling(s) and growing medium, it is preferred that the frangible strip 140 be located such that the top portion 110 is not less than 0.5 cm in height, and it is still more preferred that the frangible strip 140 be located such that the top portion 110 is not less than 1.0 cm in height. With respect to the taper of the compartment 150 in the axial direction for retention of the seedling plug when the top portion 110 is to serve as rim for retaining seedlings, while the draft angle employed for ordinary manufacture may be sufficient, it is preferred in such embodiments for more definitive retention of the seedling plug that this taper angle be up to on the order of 30°, and preferably on the order of 15° to 25°, from the compartment axial direction.

Referring to FIG. 5, another embodiment of the present invention is a multiple-seedling container 200 having a plurality of compartments 250, each compartment 250 having one or more frangible tear-off strips 240 dividing each compartment 250 into a top portion 210 and a bottom portion 220.

The multiple-seedling container 200 shown at FIG. 5 is in the form of a tray having a plurality of compartments 250 for respectively receiving soil or other growing medium and for respectively receiving seeds that will be allowed to grow into seedling plugs ready for transplanting to a larger container or to an outdoor garden. Any suitable decomposable or nondecomposable material may be used for the seedling container 200, examples including thermoplastic or thermosetting resin (foamed and/or unfoamed) and cardboard. The seedling container 200 may be manufactured through use of a mold or by any other appropriate method.

Although the compartments 250 in the embodiment shown in FIG. 5 have rectangular cross-section as viewed from the top, the present invention may be applied to seedling containers having compartments of circular, oval, polygonal, or any other arbitrary cross-sectional shape. Regardless of the cross-sectional shape of the compartment(s) 250, each compartment 250 is preferably open at the top so as to be able to receive growing medium, and each compartment 250 preferably has wall(s) and/or a bottom so as to be at least partially closed at the side(s) and/or bottom. The side(s) and/or bottom may have passage(s) for drainage and/or aeration. Each compartment 250 defines an axial direction more or less in the direction in which a seedling stem tends to grow as it emerges more or less centrally from the open compartment top.

For the multiple-seedling container 200 shown in FIG. 5, where each compartment 250 has its own independently tearable frangible strip 240 that permits independent removal of the container bottom portions 220, one or more additional frangible strips may be provided in the rib-like regions 214 between adjoining compartments 250 so as to permit one or more of the compartments 250 to be separable from one or more other of the compartments 250.

Moreover, the frangible strip 240 in some embodiments may be such that removal thereof simultaneously causes seedlings in neighboring compartments 250, 250 to become mutually separated from one another. For example, in an embodiment in which the frangible strip 240 is present in a rib-like region 214 between adjoining compartments, removal of the frangible strip will result in removal of the rib-like webbing that mutually joins adjacent compartments, causing the formerly adjoining compartments to become separated from one another. That is, the frangible strip 240 in some embodiments may be so placed that removal of the frangible strip 240 causes mutual separation of adjoining compartments 250, 250 at the same time that its removal permits removal of the container bottom portion 220.

Whereas FIG. 5 shows an embodiment in which compartments 250, 250 have their own independently tearable frangible strips, it is also possible in some embodiments to employ a single continuous frangible strip that runs continuously from one compartment to another so that a plurality, preferably all, of the compartments within a seedling container share a single common continuous frangible strip.

Depending on the number of compartments 250 making up the seedling container 200 and depending on the location of any particular compartment 250 within that seedling container 200, the top portion 210 of a compartment 250 may include outer edges 212 at the container periphery and/or rib-like regions 214 between adjoining compartments 250. Where rib-like regions 214 are present between adjoining compartments 250, these may take the form of solid webbing that is integral with, and produced at the time of molding or the like of, the compartments 250.

Where solid webbing is present in rib-like regions 214 between adjoining compartments 250, frangible tear-off stripping similar to that employed for convenient and gentle removal of the compartment bottom portion 220 from the compartment top portion 110 may also be employed in those rib-like regions 214 for convenient and gentle separation of one or more of the compartments 250 from one or more other of the compartments 250. Optional presence of such additional frangible strip(s) in the rib-like regions 214 between adjoining compartments 250 is shown schematically at FIG. 7, where exemplary routing of one such continuous rib region frangible strip is shown. Although a single continuous rib region frangible strip is indicated at FIG. 7, there is no objection to employment of a plurality of rib region frangible strips, each operable to separate any one or more of the compartments 250 from one or more other of the compartments 250 when torn off therefrom.

Figure 7:
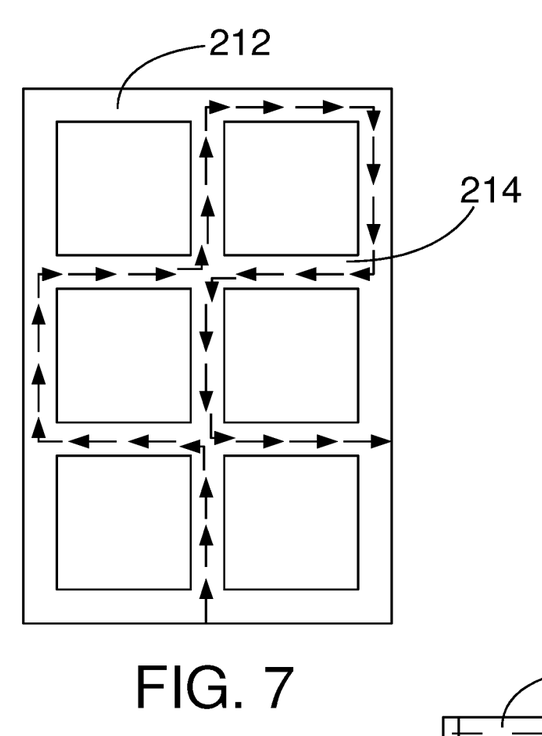
FIG. 7 is a top view showing exemplary routing of a continuous rib region frangible strip for mutual separation of compartments 250, 350 in a multiple-seedling container 200, 300.
Figure 8:
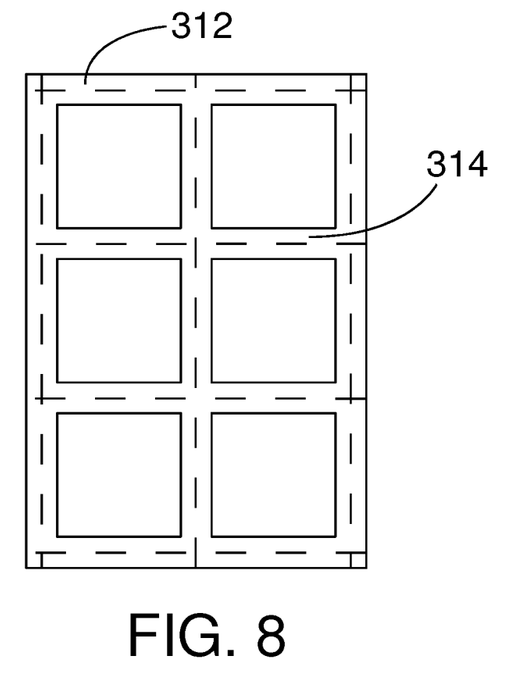
FIG. 8 is a top view showing how rib region(s) 214, 314 might be partitioned to accommodate two-lane routing for rib region frangible strip(s) that pass twice or more times through rib-like region(s) 214, 314 between any two compartments 250, 350 for mutual separation of compartments 250, 350 in a multiple-seedling container 200, 300.

Although the single continuous rib region frangible strip shown is FIG. 7 is routed in such fashion that the path taken as the rib region frangible strip is torn off therefrom never passes twice through the rib-like region 214 between any two compartments 250, permitting efficient and complete separation of compartments from each other, there is no objection to employment of one or more continuous or separate rib region frangible strip(s) routed in such fashion that the path(s) taken as rib region frangible strip(s) are torn off passes twice or more times through the rib-like region 214 between any two compartments 250, 250. Where, for example, such a rib region frangible strip is routed in such fashion that the path taken thereby passes twice through rib-like region(s) 214, rib-like region(s) 214 might be partitioned for example as indicated schematically in FIG. 8 to accommodate various two-lane routing schemes for accomplishment thereof.

Alternatively, although not shown in the drawings, to facilitate separation of the rib-like regions 214 so as to permit one or more of the compartments 250 to be separable from one or more other of the compartments 250, the rib-like regions 214 may comprise button-like indentations such that mating pairs of convex and concave surfaces of neighboring compartments 250 join in mutually detachably connected fashion in the interstices between compartments 250. Although not shown in the drawings, similar effect may also be achieved where the rib-like regions 214 comprise overlapping surfaces of neighboring compartments 250 on which sticky-type noncurable adhesive has been applied so as to join adjacent compartments 250 in mutually detachably connected fashion.

In the multiple-seedling container 200 shown in FIG. 5, each compartment 250 has its own independently tearable frangible strip 240 for separation of the bottom portion 220 from the top portion 210. Furthermore, in the embodiment shown in FIG. 5, each such frangible strip 240 has its own pull tab 245.

Figure 6:
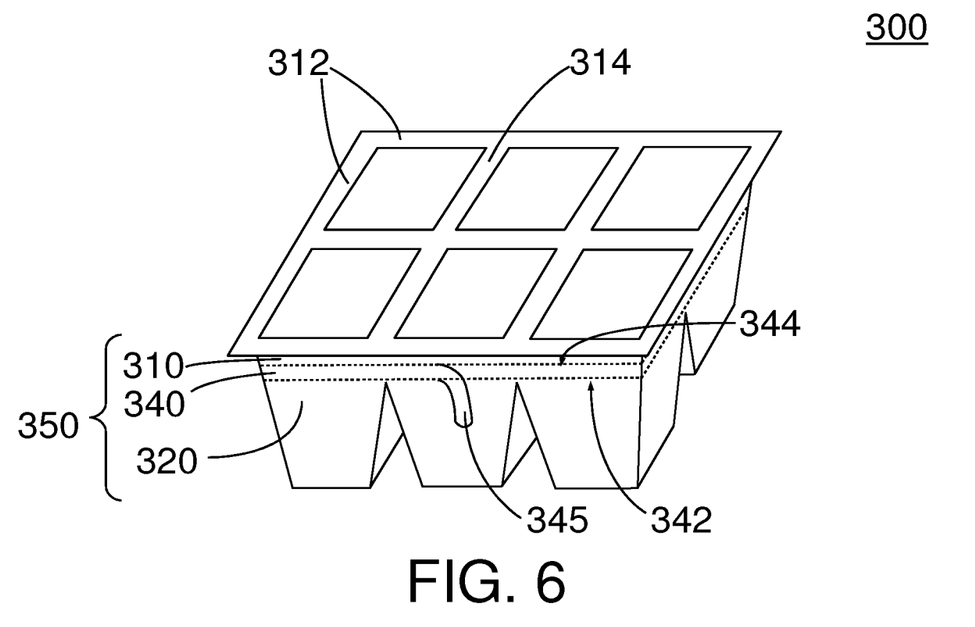
FIG. 6 is a perspective view of a multiple-seedling container 300 in accordance with yet another embodiment in which a common frangible strip is so placed that removal of the frangible strip causes simultaneous removal of all container bottom portions 320, 320 and exposure of the seedling roots.

In the multiple-seedling container 300 shown in FIG. 6, a common frangible strip 340 is so placed that removal of the frangible strip 340 causes simultaneous removal of all container bottom portions 320, 320 and exposure of the seedling roots. At FIG. 6, because the common frangible strip 340 is arranged so as to be completely above the apices where walls of adjacent compartments 350, 350 meet to form ribs 314, removal of the common frangible strip 340 causes compartment bottoms 320, 320 to be removed from compartment tops 310, 310 but does not necessarily cause compartments 350 to be separated from each other. If in addition the frangible strip 340 shown in FIG. 6 were to be arranged in such fashion that its straddles, in the compartment axial direction, the apices where walls of adjacent compartments 350 meet to form ribs 314, and in such fashion that the frangible strip 340 extends from edge to edge in the multiple-seedling container 300, removal of the common frangible strip 340 would not only cause compartment bottoms 320 to be removed from compartment tops 310 but would also simultaneously cause compartments 350 to be separated from each other.

Comparing FIGS. 5 and 6, note that, for the embodiments shown, the height of the frangible strip 240, 340 in the axial direction affects whether each compartment 250, 350 has its own independent frangible strip 240 or whether a plurality of the compartments 350, 350 share a common frangible strip 340 such as will occur when the frangible strip 340 is higher than the apices where walls of adjacent compartments 350, 350 meet to form ribs 314, 314. That is, when the frangible strip 340 is at a height causing it to coincide with the ribs 314, 314 between adjacent compartments 350, 350, removal of the frangible strip 340 may in some embodiments be also made to result in separation of the adjacent compartments 350, 350 from one another at the same time that it permits removal of the bottom portions 320, 320 from the top portions 310, 310.

There is no particular restriction with respect to the height of the frangible strip 240, 340 in the axial direction, but in an embodiment such as that shown in FIG. 5 in which each compartment 250 has its own frangible strip 240 and the compartments 250 are intended not to be separated from each other prior to transplanting but are intended to be transplanted together as an integral unit, to allow sufficient height for retaining seedling(s) and growing medium, and to prevent the frangible strip 240 from becoming too close to the apices where walls of adjacent compartments 250, 250 meet to form ribs 214, 214 so that the respective compartments 250, 250 can be maintained in an integral state at least until such time as they can be transplanted together, it is preferred that the frangible strip 240 be located such that the top portions 210, 210 are not less than 1.0 cm in height, and it is still more preferred that the frangible strip 240 be located such that the top portions 210, 210 are not less than 2.5 cm in height.

Conversely, in an embodiment such as that shown in FIG. 6 in which a common frangible strip 340 is to be so placed that removal of the frangible strip 340 causes mutual separation of adjoining compartments 350, 350 at the same time that its removal permits removal of the container bottom portion 320, 320 and exposure of the seedling roots, to allow sufficient height for retaining seedling(s) and growing medium while causing the frangible strip 340 to be routed along the apices where walls of adjacent compartments 350, 350 meet to form ribs 314, 314 so that the respective compartments 350, 350 can be separated from each other when the frangible strip 340 is torn off therefrom, it is preferred that the frangible strip 340 be located such that the top portions 310, 310 are not less than 0.25 cm in height, and it is still more preferred that the frangible strip 340 be located such that the top portions 310, 310 are not less than 1.5 cm in height.

In an embodiment in which multiple seedlings are planted in separate compartments within a tray-like multiple-seedling container, the rim-like top portion 210, 310 may remain integral, i.e., respective compartments stay together as a group and preserve their relative positional relationship with respect to each other, after removal of the frangible strip, the integral rim-like top portion 210, 310 and seedling(s) retained thereby being placed in or on the ground together during transplanting. For example, such an integral rim-like top portion 210, 310 might be allowed to decompose if made of decomposable material or might be collected and discarded at the end of the growing season or some other suitable time if made of nondecomposable material. With such a multiple-seedling container having an integral rim-like top portion 210, 310, it is preferred that seedling compartments within the container be spaced so as to have the pitch and arrangement that is desired for the seedlings following transplanting.

The embodiments shown in FIGS. 5 through 8 are tray-like seedling containers 200, 300 having six compartments 250, 350 arranged in two rows of three. Note that multiple-seedling container embodiments of the present invention are not limited to such linear or row-like arrangements but permit a wide variety of geometric shapes and configurations. Especially where compartments are intended not to be separated from each other prior to transplanting but are intended to be transplanted together as an integral unit, arrangement of compartments in certain geometric configurations may facilitate transplanting of seedlings in desired patterns. For example, following removal of frangible strip(s), top portions from a plurality of seedling containers of semicircular or arcuate configuration may be arranged with commonly directed centers of curvature so that transplanted seedlings surround and/or border a tree or other such object. Alternatively, during transplanting, semicircular or arcuate seedling containers may be arranged such that their centers of curvature are directed to successively alternating sides so as to create a wavy or scalloped effect. Moreover, seedling containers having such arcuate, elliptical, or oval configuration permit seedlings to be conveniently transplanted in patterns producing soft or rounded radii of curvature at corner points or inflections created when a line of seedlings changes direction, such as when being planted so as to generally follow the profile of a fence, wall, or other such border.

Whereas several preferred embodiments of the present invention and variations thereof have been described above, these examples have been presented merely for purposes of describing the invention and it not intended that the invention should be limited thereby. The present invention may be carried out in the context of a wide variety of modes and embodiments other than those specifically presented herein.

What is claimed is:

1. A seedling container comprising:
   a compartment having:
      exactly one top portion, the top portion having an open top face;
      exactly one bottom portion; and
      exactly one frangible strip, the frangible strip being disposed between the top portion and the bottom portion;
   wherein the compartment defines an axial direction more or less in a direction in which a seedling stem tends to grow as it emerges more or less centrally from the open top face of the top portion;
   wherein the frangible strip is separated from the top portion by an upper circumferential score line and is separated from the bottom portion by a lower circumferential score line;
   wherein the upper circumferential score line is arranged about the periphery of the compartment so as to form a first at least partially closed loop having a locus which is more or less circumferential with respect to the compartment axial direction;
   wherein the lower circumferential score line is arranged about the periphery of the compartment so as to form a second at least partially closed loop having a locus which is more or less circumferential with respect to the compartment axial direction, the upper circumferential score line being generally parallel to the lower circumferential score line;
   wherein a transverse score line interconnects the lower circumferential score line and the upper circumferential score line; and
   wherein the top portion tapers so as to make an angle of not less than 15° and not more than 25° with respect to the compartment axial direction;
   width of the frangible strip does not exceed 0.3 cm;
   height of the top portion does not exceed 1.0 cm; and
   length of the pull tab is not less than 1.0 cm and not more than 3.0 cm.

2. The seedling container according to claim 1 wherein the frangible strip has a pull tab; and
   at least one of the upper and the lower circumferential score lines is discontinuous in a vicinity of where the pull tab is attached to the frangible strip.

3. The seedling container according to claim 1 wherein the frangible strip has a pull tab;
   a first side edge of the pull tab is collinear with the transverse score line so as to be indirectly connected to at least one of the lower and upper circumferential score lines by way of the transverse score line which intervenes therebetween, and a second side edge of the pull tab is directly connected to the other of the lower and upper circumferential score lines; and
   the transverse score line makes an angle of not less than 30° and not more than 60° with at least one of the upper and the lower circumferential score lines.

4. The seedling container according to claim 1 wherein the frangible strip has a pull tab;
   two transverse score lines interconnect the lower and upper circumferential score lines in such fashion as to terminate the frangible strip to either side of a web formed therebetween; and the transverse score lines respectively make angles of not more than 30° with the upper and the lower circumferential score lines.

5. The seedling container according to claim 1 wherein the upper, lower, and transverse score lines are perforated lines.

6. The seedling container according to claim 1 wherein the top portion has a rim configured to retain a seedling following removal of the bottom portion.

7. The seedling container according to claim 1 wherein width of the frangible strip is less than height of the top portion.

8. The seedling container according to claim 1 wherein width of the frangible strip is less than height of the bottom portion.

9. The seedling container according to claim 1 wherein the compartment contains growing medium.

10. The seedling container according to claim 9 wherein the growing medium is soil.

11. The seedling container according to claim 1 wherein the compartment has at least one passage permitting drainage therethrough.

12. A seedling container comprising:
a plurality of compartments, each of the compartments having:
exactly one top portion, the top portion having an open top face;
exactly one bottom portion; and
exactly one frangible strip, the frangible strip being disposed between the top portion and the bottom portion;
wherein the compartment defines an axial direction more or less in a direction in which a seedling stem tends to grow as it emerges more or less centrally from the open top face of the top portion;
wherein the frangible strip is separated from the top portion by an upper circumferential score line and is separated from the bottom portion by a lower circumferential score line;
wherein the upper circumferential score line is arranged about the periphery of the compartment so as to form a first at least partially closed loop having a locus which is more or less circumferential with respect to the compartment axial direction;
wherein the lower circumferential score line is arranged about the periphery of the compartment so as to form a second at least partially closed loop having a locus which is more or less circumferential with respect to the compartment axial direction, the first loop being generally parallel to the second loop;
wherein a transverse score line interconnects the lower circumferential score line and the upper circumferential score line;
wherein at least two of the compartments of the seedling container share a common frangible strip; and
wherein the common frangible strip is routed in such fashion as to cause at least two of the compartments to be mutually separated when the common frangible strip is torn off therefrom.

13. The seedling container according to claim 12 wherein at least two of the compartments of the seedling container share a second common frangible strip; and
the second common frangible strip is routed in such fashion as to cause at least two of the bottom portions to be removed without causing mutual separation of the compartments when the second common frangible strip is torn off therefrom.

14. The seedling container according to claim 13 wherein the respective top portions of the respective compartments form a common rim-like top portion; and
after the second common frangible strip is torn off therefrom, the compartments continue to be held together by the common rim-like top portion so that the respective top portions stay together as a group and preserve their relative positional relationships with respect to each other.

15. The seedling container according to claim 12 further comprising a rib region frangible strip that permits at least two of the compartments to be mutually separated when the rib region frangible strip is torn off therefrom;
wherein the rib region frangible strip is a single continuous rib region frangible strip routed in such fashion that a path taken as the rib region frangible strip is torn off therefrom never passes twice through a rib-like region between any two of the compartments.

16. The seedling container according to claim 12 further comprising a rib region frangible strip that permits at least two of the compartments to be mutually separated when the rib region frangible strip is torn off therefrom;
wherein the rib region frangible strip is routed in such fashion that a path taken as the rib region frangible strip is torn off therefrom passes twice through a rib-like region between at least two of the compartments, passage of the rib region frangible strip twice through the rib-like region being made possible by partitioning of the rib-like region into two lanes.

17. The seedling container according to claim 12 wherein at least two of the compartments of the seedling container share a common frangible strip; and
a rib region frangible strip is contiguous with the common frangible strip, causing removal of the bottom portions of the at least two compartments and causing mutual separation of the at least two compartments when the contiguous frangible strips are torn off therefrom.

18. The seedling container according to claim 12 wherein the top portion tapers so as to make an angle of not less than 15° and not more than 25° with respect to the compartment axial direction;
width of the frangible strip does not exceed 0.3 cm;
height of the top portion does not exceed 1.0 cm; and
length of the pull tab is not less than 1.0 cm and not more than 3.0 cm.

19. The seedling container according to claim 12 wherein width of the frangible strip is less than height of the top portion; and
width of the frangible strip is less than height of the bottom portion.

20. The seedling container according to claim 12 wherein each compartment contains growing medium;
the growing medium is soil; and
each compartment has at least one passage permitting drainage therethrough.

21. A seedling container comprising:
a compartment having:
exactly one top portion, the top portion having an open top face;
exactly one bottom portion; and
exactly one frangible strip, the frangible strip being disposed between the top portion and the bottom portion;
wherein the compartment defines an axial direction more or less in a direction in which a seedling stem tends to grow as it emerges more or less centrally from the open top face of the top portion;

wherein the frangible strip is separated from the top portion by an upper circumferential score line and is separated from the bottom portion by a lower circumferential score line;

wherein the upper score circumferential line is arranged about the periphery of the compartment so as to form a first at least partially closed loop having a locus which is more or less circumferential with respect to the compartment axial direction;

wherein the lower circumferential score line is arranged about the periphery of the compartment so as to form a second at least partially closed loop having a locus which is more or less circumferential with respect to the compartment axial direction;

wherein a cutout region intervenes between the lower circumferential score line and the upper circumferential score line; and wherein the top portion tapers so as to make an angle of not less than 15° and not more than 25° with respect to the compartment axial direction;

width of the frangible strip does not exceed 0.3 cm;

height of the top portion does not exceed 1.0 cm; and length of the pull tab is not less than 1.0 cm and not more than 3.0 cm.

22. The seedling container according to claim 21 wherein width of the frangible strip is less than height of the top portion; and width of the frangible strip is less than height of the bottom portion.

* * * * *

UNITED STATES PATENT AND TRADEMARK OFFICE
CERTIFICATE OF CORRECTION

| | | |
|---|---|---|
| PATENT NO. | : 11,395,462 B2 | Page 1 of 1 |
| APPLICATION NO. | : 13/844649 | |
| DATED | : July 26, 2022 | |
| INVENTOR(S) | : Dunn | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1424 days.

Signed and Sealed this
Eleventh Day of February, 2025

Coke Morgan Stewart
*Acting Director of the United States Patent and Trademark Office*